(12) United States Patent
Simon

(10) Patent No.: US 8,008,797 B2
(45) Date of Patent: Aug. 30, 2011

(54) SYSTEM FOR CONVERTING WIND POWER TO ELECTRCIAL POWER WITH TRANSMISSION

(76) Inventor: Bernard Joseph Simon, Troy, MI (US)

( * ) Notice: Subject to any disclaimer, the term of this patent is extended or adjusted under 35 U.S.C. 154(b) by 328 days.

(21) Appl. No.: 12/370,760

(22) Filed: Feb. 13, 2009

(65) Prior Publication Data

US 2010/0207396 A1    Aug. 19, 2010

(51) Int. Cl.
*F03D 9/00* (2006.01)
(52) U.S. Cl. .......................................... 290/55; 290/44
(58) Field of Classification Search .................... 290/55, 290/44, 45; 74/665 A, 665 G; 475/332, 475/248, 311
See application file for complete search history.

(56) References Cited

U.S. PATENT DOCUMENTS

| | | | | |
|---|---|---|---|---|
| 4,357,542 A * | 11/1982 | Kirschbaum | | 290/44 |
| 4,744,267 A | 5/1988 | Lepelletier | | |
| 4,788,887 A | 12/1988 | Lepelletier | | |
| 5,106,352 A | 4/1992 | Lepelletier | | |
| 5,370,589 A | 12/1994 | Lepelletier | | |
| 6,758,786 B2 | 7/2004 | Lepelletier | | |
| 7,081,689 B2 * | 7/2006 | Tilscher et al. | | 290/44 |
| 7,635,923 B2 * | 12/2009 | DeAngeles | | 290/44 |
| 7,843,079 B2 * | 11/2010 | Tseng et al. | | 290/45 |
| 2005/0280264 A1 * | 12/2005 | Nagy | | 290/55 |
| 2007/0007769 A1 * | 1/2007 | Basteck | | 290/1 C |
| 2007/0205602 A1 * | 9/2007 | Willey et al. | | 290/44 |
| 2009/0278352 A1 * | 11/2009 | Rivas et al. | | 290/44 |

OTHER PUBLICATIONS

Wikipedia, http://en.wikipedia.org/wiki/Epicyclic_gearing, Epicyclic gearing—Wikipedia, the free encyclopedia.*
Robert E. Sheldahi, Comparison of Field and Wind Tunnel Darrieus Wind Turbine Data, report Issued by Sandia National Laboratories, Jan. 1981, for the United States Department of Energy, USA.
Ryan Wiser and Mark Bolinger, Annual Report on U.S. Wind Power Installation, Cost, and Performance Trends: 2007, May 2008, United States Department of Energy, USA.
George Marsh, Patently Innovative, Renewable Energy Focus Magazine, Mar.-Apr. 2007, pp. 30-35, Elsevier Ltd, USA.
Professor Craig W. Somerton, Wind Energy Calculations, ME 417 Design of Alternate Energy Systems course handout, undated, Michigan State University, Lansing, Michigan.
Ria Fathiyah, Ryan Mellot, and Mahendra Panagoda, Windmill Design Optimization through Component Costing, May 2001, Michigan State University Industrial Mathematics report for the McCleer Power Inc., Michigan State University, Lansing, Michigan.

* cited by examiner

*Primary Examiner* — Michael C Zarroli

(57) ABSTRACT

A system for converting wind power to electrical power comprising a transmission module with multiple power flows to an output and a first generator coupled to the output, wherein the first generator operates at substantially constant speed for the multiple power flows. A method is also disclosed that operates a system that converts wind power to electrical power utilizing a transmission module and comprises the steps of operating the transmission module with a first power flow to an output coupled to a generator, and operating the transmission module with a second power flow to the output coupled to the generator, wherein the generator operates at substantially constant speed for the first and second power flows.

11 Claims, 12 Drawing Sheets

SYSTEM FOR CONVERTING WIND POWER TO ELECTRCIAL POWER WITH TRANSMISSION

BACKGROUND OF THE INVENTION

Wind turbine systems are often used to generate electricity from wind energy. One approach to implementing wind turbines utilizes constant rotational speed generators. In attempting to maximize the efficiency of a constant speed system, a difficulty arises due to the relationship of efficiency of the wind turbine to wind speed and turbine tip speed. More particularly, a given turbine blade typically operates at maximum efficiency when the blade tip speed is within a narrow ratio to wind speed. Turbine efficiency drops if the tip speed is either too low or too high relative to wind speed.

A known solution to managing tip speed is to use a variable RPM generator connected via fixed gearing to the turbine. This allows the generator to manage turbine speed by varying the load and thereby maintaining the turbine at an optimal speed. Some known variable RPM generators use expensive rare earth permanent magnets, increasing the cost of the generator. The energy produced by the variable RPM generator is of variable frequency and does not match the grid frequency (60 Hz), and therefore the energy must be adjusted through power electronics, adding significant cost to the system.

A known approach to reducing power capacity and expense of power electronics is to use a doubly fed induction generator, which has a fixed frequency stator and a variable frequency rotor fed by slip rings. Power electronics are only required to condition the energy generated from the rotor, which is typically 20-25% of the total generated power. A drawback to this approach is the use of slip rings, which may wear and need replacing. Another approach to reducing the power capacity and expense of power electronics is to use a brushless doubly fed induction generator which has both fixed frequency and variable frequency windings in the stator and induced currents in the rotor. A draw back to this approach is reduced overall efficiency of the generator because of the extra set of windings required.

With known wind generator systems, measures are put in place to manage high wind speed conditions in which the wind power provided exceeds the generation capability of the generator. In one example, during high wind conditions, the turbine is turned so that it does not face directly into the wind. This reduces turbine efficiency so that the turbine receives a fraction of the wind power and so the generator can still generate electricity. In another example, the wind turbine is locked so that it cannot rotate at high wind speeds to prevent damage from either overpowering the generator or from excessive turbine speed.

In a known turbine generator system, turbine blades connected to a rotor hub are driven by the wind and drive a low-speed shaft. The low-speed shaft drives a fixed ratio gearbox which then drives the high-speed shaft, which then drives the generator. A yaw drive and yaw motor work together to turn the turbine into the wind for maximum energy capture, and also to turn the turbine out of the wind if wind speeds get too high and the wind power transferred to the turbine exceeds the generator capacity. A disk brake provides and emergency braking and mechanical locking function. A cooling system prevents the generator from overheating, and an anemometer provides wind speed sensing for a controller.

SUMMARY OF THE INVENTION

Advantageously, an improved power generating system and method are described herein.

Advantageously, in a preferred example, a system for converting wind power to electrical power comprises a transmission module with multiple power flows to an output and at least one generator coupled to the output, wherein the at least one generator operates at substantially constant speed for the multiple power flows.

Advantageously, in another example, a method of operating a system that converts wind power to electrical power utilizing a transmission module comprises the steps of operating the transmission module with a first power flow to an output coupled to a generator, and operating the transmission module with a second power flow to the output coupled to the generator, wherein the generator operates at substantially constant speed for the first and second power flows.

DETAIL DESCRIPTION OF PREFERRED EXAMPLES

Figure 1:
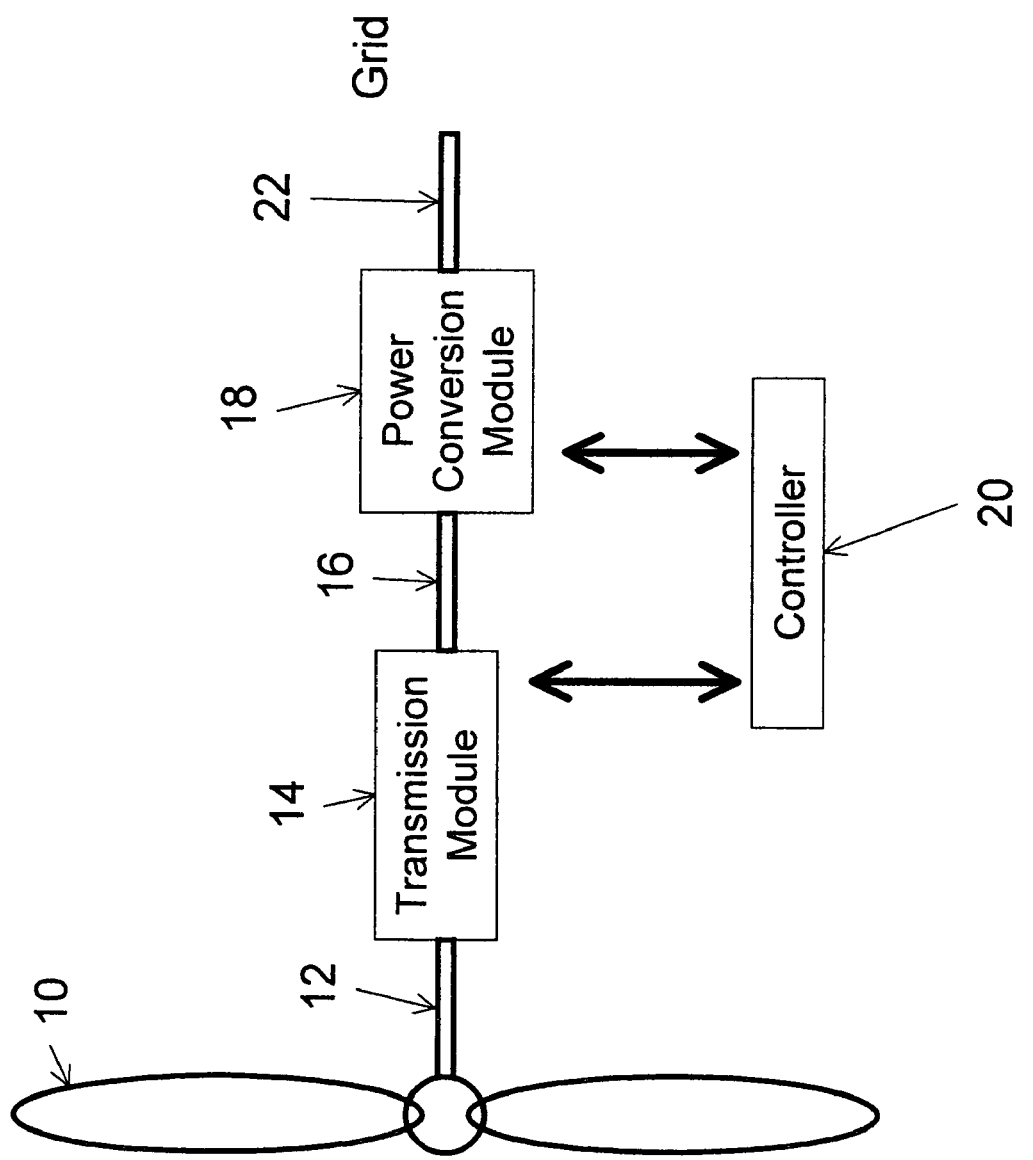
FIG. 1 illustrates an example system according to the invention.

Referring to FIG. 1, a power generating system for converting wind power to electrical power is provided including the turbine 10 acting to receive wind power and to provide rotational energy through shaft 12 to the transmission module 14. The turbine 10 may be any known wind turbine, and in one example has a three blade design known for use in wind generating systems.

Characteristics of the turbine 10 include a relationship between wind speed and rotation speed; for a given wind speed, the blades of the turbine optimally rotate at a given speed, subject to load conditions on the turbine. The output power of turbine 10 increases with (a) the cube of wind speed and, for planning turbine sizing, (b) with the square of blade diameter.

The transmission module 14 receives its input energy from the turbine 10 through the shaft 12 and provides a rotational output 16 at a selectable speed ratio to the input shaft 12. The transmission module has multiple power flows to output 16.

A power conversion module 18 receives the rotational output 16 and converts the rotational output to electric power provided to the grid 22. The transmission module has multiple power flows to output 16 and at least one generator in the power conversion module 18 is coupled to the output and operates at substantially constant speed for the multiple power flows.

Controller 20 is coupled to the transmission module 14 and the power conversion module 18. The controller 20 sends commands to the transmission module 18 commanding a first rotational output 16 speed for a first input 12 speed corresponding to a first range of wind speed. For example, in low wind speeds, the transmission is commanded to have output 16 speed at a higher ratio to input 12 speed. For a second input 12 speed corresponding to a second range of wind speed, the controller 20 commands the transmission module 18 to change input to output gear ratio so that the output 16 speed is at a second ratio to input 12 speed. For example, in higher wind speeds, the transmission is commanded to have output 16 speed at a lower ratio to input 12 speed. The system allows a substantially constant rotational output speed to be maintained for the multiple wind speed ranges and allows the turbine to rotate in higher efficiency wind to turbine tip speed ratio for a wider range of wind speeds.

In an example implementation, the power conversion module 18 includes an induction generator, which provides a cost-effective machine for converting the rotational energy to electricity for power to the grid 22. The induction generator, under control of the controller 20 may be excited by the grid 22 to provide instant excitation at the reference frequency of the grid 22 (typically 60 Hz). The induction generator uses the reference frequency of the grid 22 to control speed similar to the manner that an induction motor maintains its reference speed based upon the frequency of the current provided. The input energy from the turbine 10 provides rotational power to the output 16 that attempts to force the induction generator to rotate faster than its reference speed. This places the induction generator in a positive slip condition and causes it to generate power, fed back to the grid 22.

In an alternative example, the generator may be operated in a self-exciting mode, in which case capacitors may be used to tune the reference frequency to that of the grid 22.

Rotational sensing techniques, either using sensors or implementing sensorless methods may be used to a monitor the slip of the generator to (1) determine whether the wind speed is great enough to cause the generator to rotate fast enough to generate power, (2) determine the amount of slip and amount of power being generated by the generator, and (3) determine when blade tip speed is out of range for current wind speed so that the transmission can be switched to an alternate gear. In addition, or in alternative, a separate wind speed sensor can be used as input for controlling activation of the generator and shifting of the transmission module 14.

Depending upon the specific implementation, the rotational output 16 of the transmission module 14 may be provided by a single output shaft or may be provided by multiple output shafts.

Figure 2:
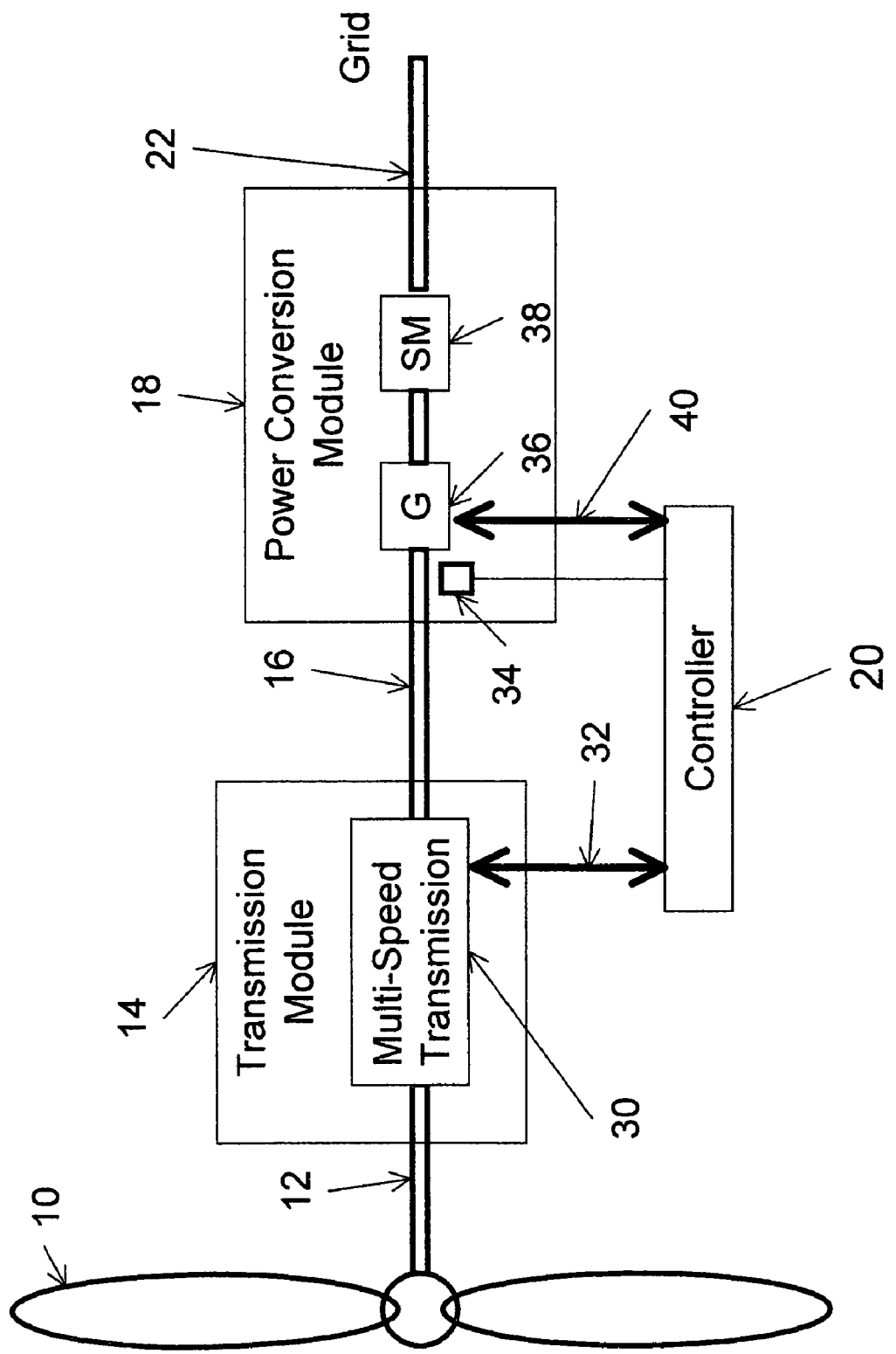
FIG. 2 illustrates example details of a system of FIG. 1.

Referring now to FIG. 2, in the system shown the transmission module 14 includes a transmission 30 selectable between at least two gear ratios, for example a three (or more) speed transmission, coupled between the turbine 10 for receiving wind energy and at least one generator 36 in the power conversion module 18. The generator 36 is mechanically coupled to the transmission 30 and electrically coupled to power grid 22 selectively through a switching module 38.

The controller 20 controls the transmission 30 through lines 32 and the generator 36, through lines 40, which control the switching module 38. If desired, rotational speed of the generator 36 is provided by a sensor 34. In this example, the generator 36 is an induction machine and power from the grid provides excitation current to the generator 36 at a frequency defining a synchronous speed of the generator.

The controller 20 controls the system so that at very low wind speeds, when rotational input to the generator 38 is less than the synchronous speed, the generator 36 is disconnected from the grid and spins freely without imparting load on the system (other than frictional losses). When the wind speed increases to the point at which the transmission, in its highest gear, can rotate the generator 36 at the synchronous speed or greater, the controller 20 controls the switching module 38 to excite the generator 36. In this state, the wind energy provides power driving the generator 36 at a speed equal to or greater than the synchronous speed so that the generator operates with positive slip, and the output power increases as positive slip imparted on the generator 36 increases.

When the wind speed increases further, turbine efficiency will drop as the generator 36 holds the turbine at too low a rotational speed. At this point, the controller 20 downshifts the transmission 30 to a gear ratio so that the turbine accelerates to a higher speed for more efficient capture of wind energy. When the wind speed increases yet again, the controller 20 again downshifts the transmission to an even lower gear ratio, again causing the turbine to accelerate to a higher speed for more efficient capture of wind energy.

Figure 3:
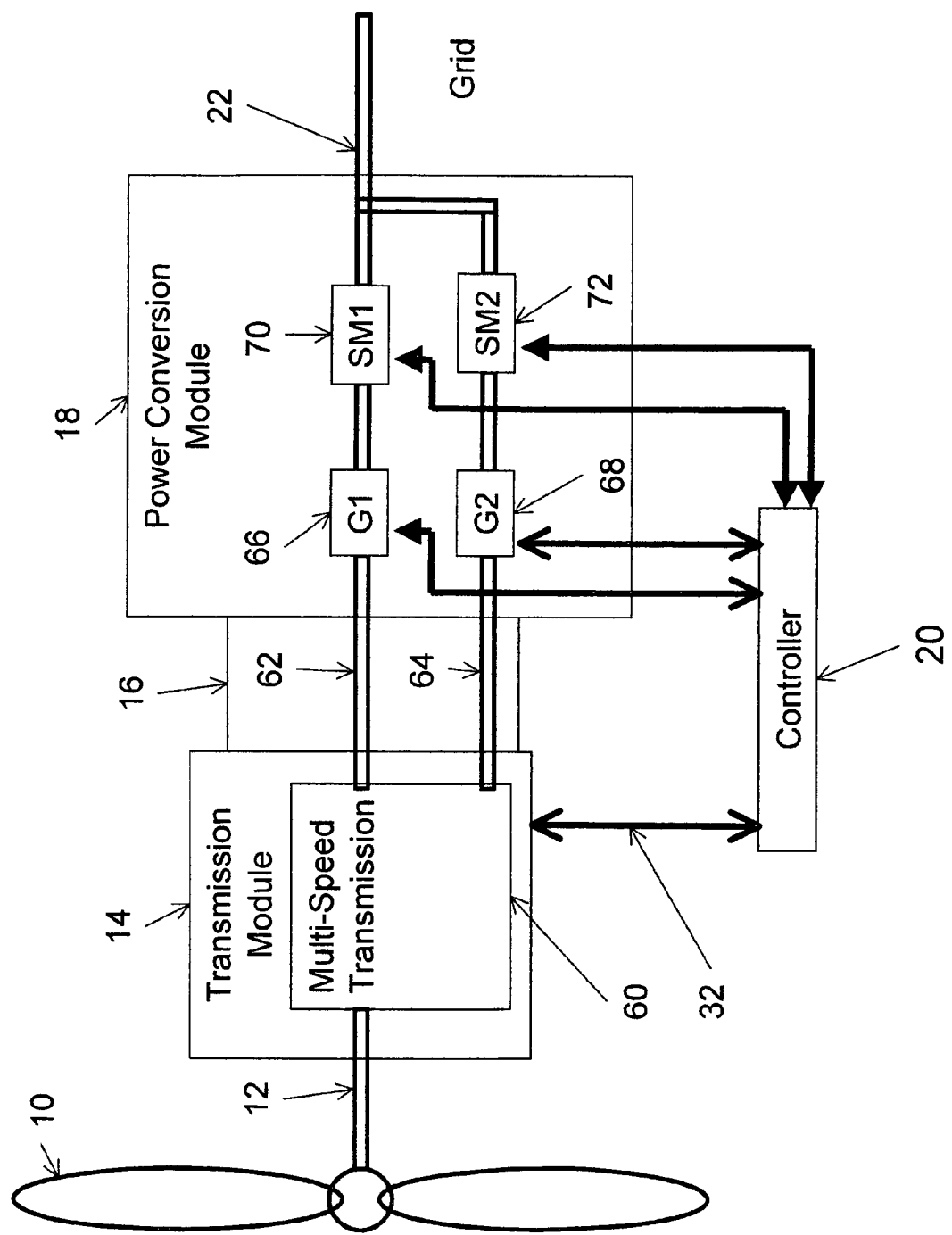
FIG. 3 illustrates example details of a system of FIG. 1 including a transmission providing power output to two generators.

Referring now to FIG. 3, the system shown includes a transmission 60 having an input coupled to shaft 12 and having an output 16 including at least first and second output shafts 62 and 64. A first generator 66 is coupled to the first output shaft 62 and a second generator 68 is coupled to the second output shaft 64. The first generator 66 has an associated switching module 70 and the second generator 68 has an associated switching module 72.

The controller 20 controls the transmission 60 and the first and second generators 66 and 68 through the switching modules 70 and 72. When the wind speed is very low and the transmission 60 cannot provide rotational output of either shaft 62 or 64 at sufficient speed to match the synchronous speed of either generator 66 or 68, then both generators are turned off and one or both spin freely. When the wind speed increases to a first range where it may provide power to the generators 66, 68, controller 20 commands the transmission 60 so that the first output shaft 62 provides power to the first generator 66 and the second output shaft 64 does not provide power. When the wind speed increases to a range where the first generator 66 reaches its maximum power rating, the controller 20 commands the transmission 60 so that the second output shaft 64 provides power to the second generator 68 and the first output shaft 62 does not provide power. When the wind speed increases to a range where the second generator 68 reaches its maximum power rating, the controller 20 commands the transmission 60 so that the first and second output shafts 62 and 64 provide power to the first and second generators 66 and 68.

The transmission 60 is geared to proportion the power between the two generators 66 and 68 as desired. In an example, generator 66 has a first power capacity P1 and generator 68 has a second power capacity P2, for example, P2=2*P1. In the first active wind speed range, power generated by the system equals a range zero to P1. In the second active wind speed range, power generated by the system equals a range of P1 to P2. And in the third active wind speed range, power generated by the system equals a range of P2 to P2+P1.

In a preferred implementation, the first and second generators 66 and 68 are inductance generators. In this example, in the first range of wind speed, the first generator 66 rotates at or near its synchronous speed; in the second range of wind speed the second generator 68 rotates at or near its synchronous speed; and in the third range of wind speed, the first and second generators 66 and 68 rotate at their synchronous speeds. The synchronous speeds of the generators 66, 68 may be equal, or may be unequal, for example, if the generators 66, 68 have unequal poles.

In another preferred implementation, the second generator 68 is an induction machine and the first generator 66 is a variable speed generator, in which case switching module 70 also includes a power electronics control for the first generator 66. Through use of the variable speed generator 66, the system may be configured so that the turbine 10 may operate at continuously changing speeds while generator 68 is maintained at constant speed. The system may also be configured so that the electrical power coupled through the power electronics in switching module 70 is less than half the power generated by the system. Through optimization, the electrical power coupled through the power electronics control in switching module 70 is less than one eighth of the power generated by the system. Thus by using a variable speed generator 66, a continuously variable wind turbine speed may be utilized, maximizing efficiency of the turbine and reducing power electronics to a smaller fraction of the total power than herebefore known for continuously variable turbine systems. Thus this example offers more cost efficient solution than before known, even accounting for the cost of the transmission 60.

Figure 4:
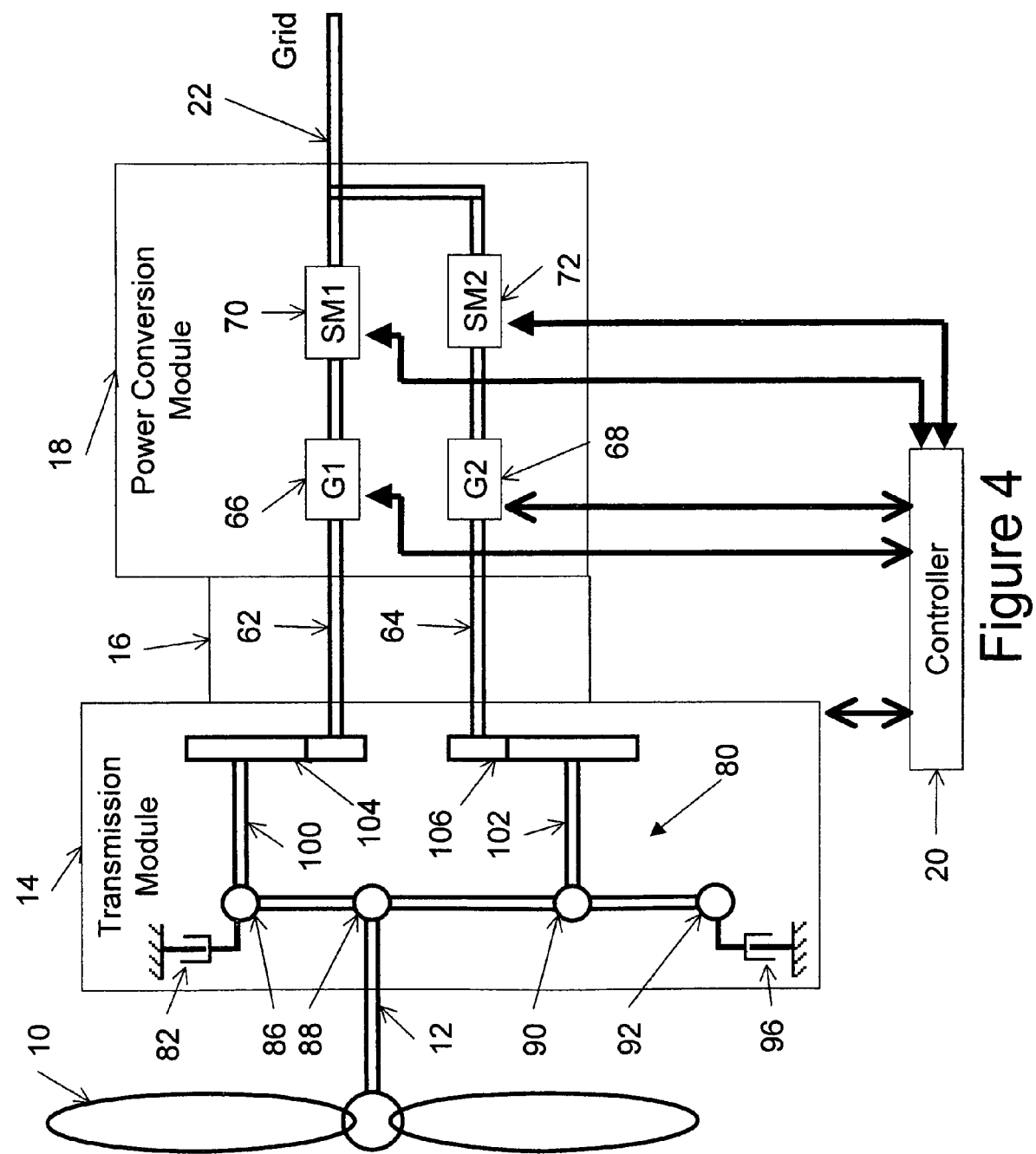
FIG. 4 illustrates example details of a system of FIG. 1 including a four node transmission.

Referring now to FIG. 4, the system shown includes transmission 80 having an input coupled to shaft 12 and at least first and second outputs transmission outputs 62 and 64 coupled to generators 66 and 68 through fixed gear sets 104 and 106. The controller 20 controls the transmission and the first and second generators 66 and 68 through the switching modules (controllers) 70 and 72.

The transmission 80 includes a first node 86 coupled to a first brake clutch 82 and the first output 62. A second node 88 meshes with node 86 and is coupled to shaft 12. A third node 90 meshes with second node 88 and is coupled to the second output 64. And a fourth node 92 meshes with the third node 90 and is coupled to a second brake clutch 96.

Similar to the previous example, in a first range of wind speed impinging on the turbine, brake clutch 96 is locked, brake clutch 82 is unlocked, the first output 62 provides power to the first generator 66 and the second output 64 free-spins as generator 68 is turned off and also spins freely. In a second range of wind speed impinging on the turbine, brake clutch 82 is unlocked, brake clutch 96 is unlocked, the second output 126 provides power to the second generator 68 and the first output 64 provides power to first generator 66. Generator 68 has a maximum power rating greater than that of generator 66. In a locked state, brake clutch 82 and brake clutch 96 are both applied to prevent the turbine from spinning. Alternately, brake clutch 82 is connected to shaft 62 to provide the locking function, or it is connected to shaft 12 and can lock the turbine through its own action. In one example, the maximum power rating of the second generator is double the maximum power rating of the first generator.

In the above design, the four node transmission may be implemented using planetary gear sets—for example any planetary gear combination consisting of four unique connection points. In one example, the four node transmission utilizes a double planetary gearset with a first basic planetary gearset having a first planet carrier carrying first planet pinions meshing with a first sun gear and a first ring gear. A second basic planetary gearset has a second planet carrier carrying second planet pinions meshing with a second sun gear and a second ring gear. Two of said first, second, third and fourth nodes are each defined by a single element of the basic planetary gearsets, and two other of the nodes are each defined by elements of both basic planetary gearsets fixed for rotation with each other. The first node may be formed by the first ring gear, the second node formed by the first planet carrier and the second ring gear fixed for rotation with each other, the third node formed by the second planet carrier, and the fourth node formed by the first and second sun gears fixed for rotation with each other.

Alternatively, the first node may be formed by the first sun gear, said second node formed by the first planet carrier and the second ring gear fixed for rotation with each other, the third node formed by the first ring gear and the second planet carrier fixed for rotation with each other, and the fourth node formed by the second sun gear.

Alternatively, the first node may be formed by the first ring gear and the second sun gear fixed for rotation with each other, said second node formed by the first and second planet carriers fixed for rotation with each other, said third node formed by the second ring gear, and said fourth member being formed by the first sun gear.

Alternatively, the first node may be formed by the first and second sun gears fixed for rotation with each other, said second node formed by the second planet carrier, the third node formed by the first planet carrier and the second ring gear fixed for rotation with each other, and the fourth node being formed by the first ring gear.

Alternatively, wherein the first node is formed by the first sun gear, the second node is formed by the second ring gear, the third member is formed by the first and second planet carriers fixed for rotation with each other, and the fourth member is formed by the first ring gear and the second sun gear fixed for rotation with each other.

Alternatively, the double planetary gearset comprises a single basic planetary gearset having a planet carrier carrying planet pinions meshing with a sun gear and a ring gear, the planet carrier carries additional planet pinions meshing with the first-mentioned planet pinions and an additional sun gear, three of the nodes are parts of the single basic planetary gearset and one of the nodes are the additional sun gear. The first node may be formed by the additional sun gear, said second node may be formed by the ring gear, said third node formed by the planet carrier, and said fourth node formed by the first-mentioned sun gear. Alternatively, the first node is formed by the first-mentioned sun gear, the second node is formed by the planet carrier, said third node is formed by the ring gear, and the fourth node is formed by the additional sun gear.

Figure 5:
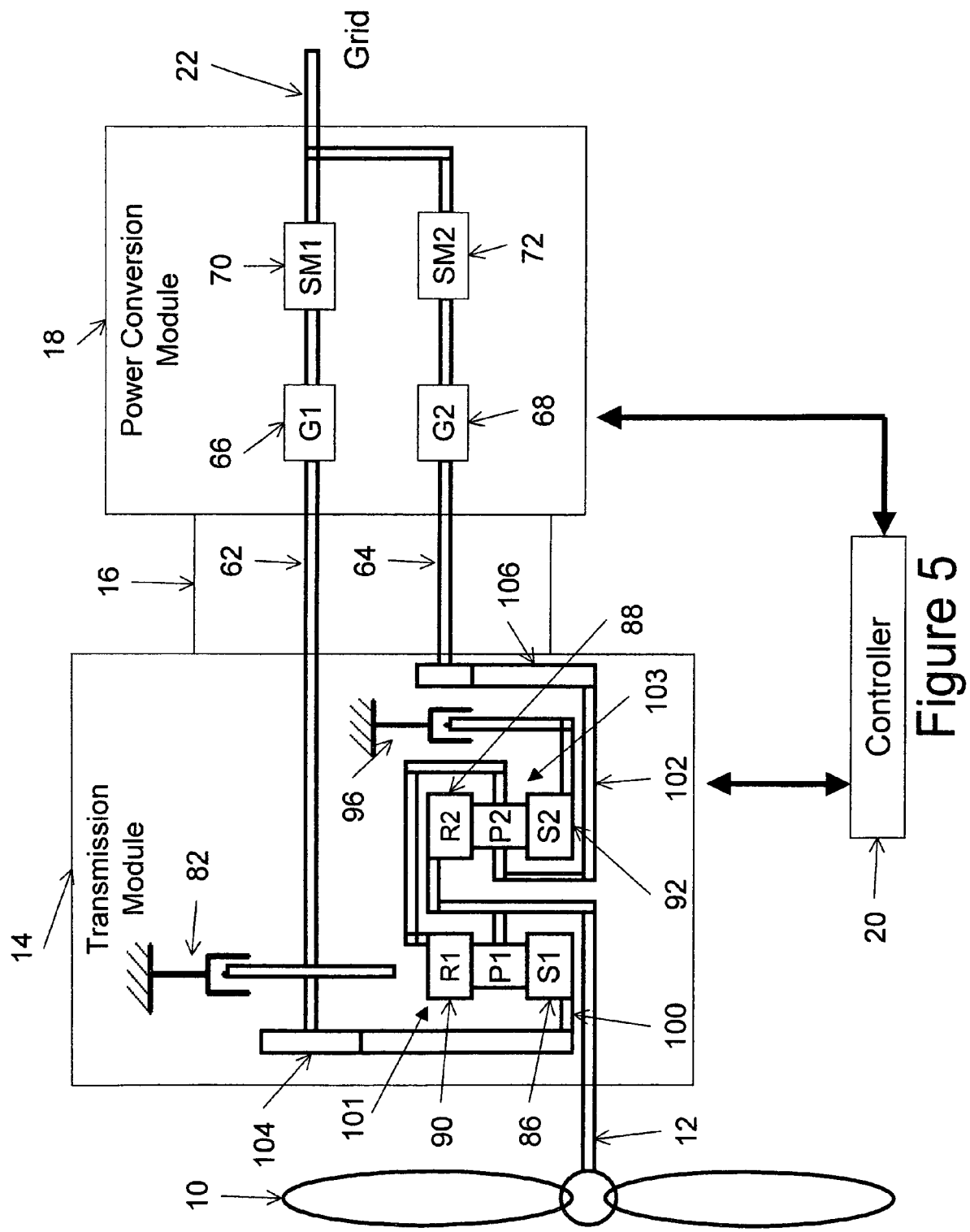
FIG. 5 illustrates example schematic details of a system of FIG. 4.

Referring now to FIG. 5, in the example shown, the four node transmission is two concentric simple planetary gear sets with carrier P1 of the first set 101 connected to the ring gear R2 of the second set 103. The carrier P1 and ring gear R2 comprise the node 88. The carrier P2 of the second planetary gear set 103 is connected to the ring gear R1 of the first planetary gear set 101. The carrier P2 and ring gear R1 comprise the node 90. Many alternate gear set arrangements also work, and the selection is mostly a matter of ratio selection and packaging.

The brake clutch 96 can be any locking mechanism which selectively prevents the rotation of the components to which it is connected, as well as an actuator for said locking mechanism. The locking mechanism could be a disk brake, a shift sleeve and fork, a friction clutch, a magnetic brake, a locking one-way clutch, or any other type of holding mechanism. The actuator could be a solenoid, servo motor, hydraulic pump and valves, power supply and controller, or any actuator that is appropriate for controlling said locking mechanism for the given application. Since brake clutch 96 may be applied and released often while the system is active, it is recommended that brake clutch 96 be of a design with low parasitic losses and no friction components. Also, since the elements connected to brake clutch 96 never counter-rotate, a one-way brake clutch may be used in parallel with said brake clutch to assist in clutch synchronization.

Brake clutch 82 may be the same as brake clutch 96, with the exception that it is only used to put the system into a 'Locked' state. As such, a simple disk friction brake may suffice.

The fixed ratio gear sets 104 and 106 can be any constant-ratio gear set, either planetary or parallel-axis.

In this example the first and second generators 66 and 68 are preferably constant RPM induction generators of sufficient power to match the desired operating points, as will be described below.

Controller 70 for the first generator 66 is implemented in a known manner to both stop and start generator 66 by cutting off and applying field excitation current. The ability to limit current for a 'soft-start' with controlled acceleration is also desirable. Current frequency adjustment is not needed.

Generator controller 72 is identical to controller 70, with the added functional requirement that it provides a braking function. This can be accomplished by injecting a DC current into the stator windings, or by swapping two of the phases, thereby reversing generator direction and causing it to motor in the opposite direction. While DC-braking and phase-swapping are simple methods for producing braking, any method of adjusting down the supply current frequency will produce a braking effect and therefore can be substituted. This function is utilized to assist in the changing the gear ratio of the system.

The controller 20 is any controller with the ability to control the generator controllers 70 and 72 and the brake clutches 82 and 96. The controller 20 is also able to sense the amount of power being generated. This can be done directly by measuring voltage and/or current from both generators, or indirectly by sensing the speed of generators 66 and 68. Other means of calculating generated power can also be substituted. Other functions added to the controller (such as the ability to communicate with and/or receive commands from a central station, sense wind speed and direction, etc. etc.) may be implemented as desired but are not central to this invention. The location of the above described control functions is also not pertinent. They could reside in three separate controllers, one controller embodying all functions, or within a centralized station.

In a shutdown or maintenance mode, the windmill is in the 'Locked' state in which both generators 66 and 68 are deactivated. Brake clutch 96 is applied, holding node 92 stationary. Brake clutch 82 is also applied, holding node 86 and generator 66 stationary. With nodes 92 and 86 held stationary, the planetary gear set is locked and both the turbine 10 and generator 68 are unable to spin.

At very low wind speeds, the windmill can be put in an 'Idle' state; generators 66 and 68 are both deactivated. Brake clutch 96 is applied, but brake clutch 82 is released. The turbine 10 is allowed to spin and will spin as determined by wind speed. But, the system will not generate any power since both generators 66 and 68 are off even though they both may be spinning. Generator 66 will be over-driven relative to turbine speed and generator 68 will be under-driven, as dictated by the gear ratio.

At wind speeds sufficient to generate power, the windmill is put in a 'First Gear' state. Brake clutch 96 is applied and brake clutch 82 is released (as in 'Idle'), and controllers 20 and 70 control generator 66 so that it is activated. Generator 68 is de-activated and thus spins freely. Generator 66 can thus be sized for a certain wind speed range and it will manage the turbine speed through the combined ratio of the planetary gear set 101, 103 and the fixed ration gear set 104.

At higher wind speeds, the windmill is put in a 'Second Gear' state. Both brake clutches 82 and 96 are released. This causes the turbine to accelerate to a speed dependent upon the fixed ratio gear sets 104 and 106, generator 66, 68 operating speeds and the ratios of planetary gear sets 101, 103. The simplest example has both generators 66, 68 at the same base speed and the ratios of gear sets 104, 106 identical, in which case turbine speed will equal generator speed adjusted by the fixed ratio of the gear sets 104, 106.

At extremely high wind speeds, the turbine 10 may be turned at an angle to the wind via a yaw motor and drive of a known type to reduce wind power into the system to a manageable level, or the system can be shut down completely by locking both brakes 82, 96. The use of a yaw drive in such a manner is well known and common to many systems.

To minimize parasitic losses, brake clutch 96 may be a mechanical locking mechanism such as a shift fork & sleeve design. A shift sleeve cannot be disengaged when it is loaded, and cannot be applied in high inertia systems when there is a large speed differential across it. During a transition from the 'First Gear' state to the 'Second Gear' state, generator 66 should be shut off when brake clutch 96 is transitioning. There will be no load across brake clutch 96 when both generators 66, 68 are deactivated. During a transition from 'Second Gear' state to 'First Gear' state, controllers 20 and 72 control generator 72 so that it provides braking torque, until the speed of node 90 is sufficiently low such that brake clutch 96 can be applied without imparting inertial shock into the system.

In an example implementation, the two chosen operating points of the system are wind speeds of 16 mph and 24 mph. Since wind power increases with the cube of wind speed, generator 72 should be approximately $(24/16)^3-1$ times the size of generator 66, or 2.375 times larger. In this example, both generators have the same synchronous speed and the fixed ratios of gear sets 104 and 106 are identical. For "Second Gear" state operation, the power into generator 68 is 2.375× the power into Generator 1. This is solely dictated by planetary gear set 101 and can be achieved if NR1/NS1=2.375. Selecting NS1=37 and NR1=91 yields 2.45, which is substantially close to the desired 2.375 and acceptable for operational purposes. With planetary gear set 101 defined, values can be selected for planetary gear set 103 such that the "First Gear" ratio of turbine 10 speed to the speed of sun gear S1 is 16/24 (or ⅔). Since ring gears R1, R2 tend to be the most expensive part of a planetary gear set, keeping them common may prove to be cost effective, so in this example NR2 is also set so that NR2=91=NR1. Then, solving the planetary speed equation of (NR2+NS2)/(NR2+NS2+NR1*NS2/NS1)=⅔ gives NS2=23 as substantially close to ideal.

Specific sizing of the generators is dependent upon turbine size and efficiency. For example, a 10 m radius turbine 10 sweeps 314 m² area, and captures 71.8 kW at 16 mph and 242 kW 24 mph wind speeds. Assuming a 45% turbine 10 efficiency, generator 66 should be sized to operate efficiently at 71.8×0.45=32 kW, and generator 68 should be sized to operate efficiently at 242×0.45−32=76.8 kW. Assuming a tip speed ratio (the ratio of the speed of the tip of the turbine blade to wind speed) of 4.175, fixed ratios of gear sets 104 and 106 are sized to hold shafts 100 and 102 to 43 RPM when generator 66 and generator 68 are at their synchronous speeds. The following table summarizes the design parameters for this example:

| | | State | 1st | 2nd |
|---|---|---|---|---|
| Gear Set | | | | |
| R1 | 91 | Wind Speed (mph) | 16 | 24 |
| S1 | 37 | Tip Speed (mph) | 67 | 100 |
| R2 | 91 | Tip Speed (m/s) | 30 | 45 |
| S2 | 23 | Turbine RPM | 29 | 43 |
| | | Wind Power (W) | 71,850 | 242,495 |
| Turbine | | Turbine Power (W) | 32,333 | 109,123 |
| radius | 10 m | Generator 1 Speed | 43 | 43 |
| Area | 314 | Generator 2 Speed | 23 | 43 |
| cp | 0.45 | Generator 1 Power (W) | 32,333 | 32,333 |
| TSR | 4.175 | Generator 2 Power (W) | 0 | 76,790 |
| | | Total Power (W) | 32,333 | 109,123 |

Alternate four-node planetary gear sets can easily be used in view of the teachings herein by properly selecting the gear ratios. In the above example, the generators 66, 68 both have the same number of poles and therefore both the same synchronous speeds. In alternative examples, the generators 66, 68 may have first and second numbers of poles that are not equal to each other.

Figure 6:
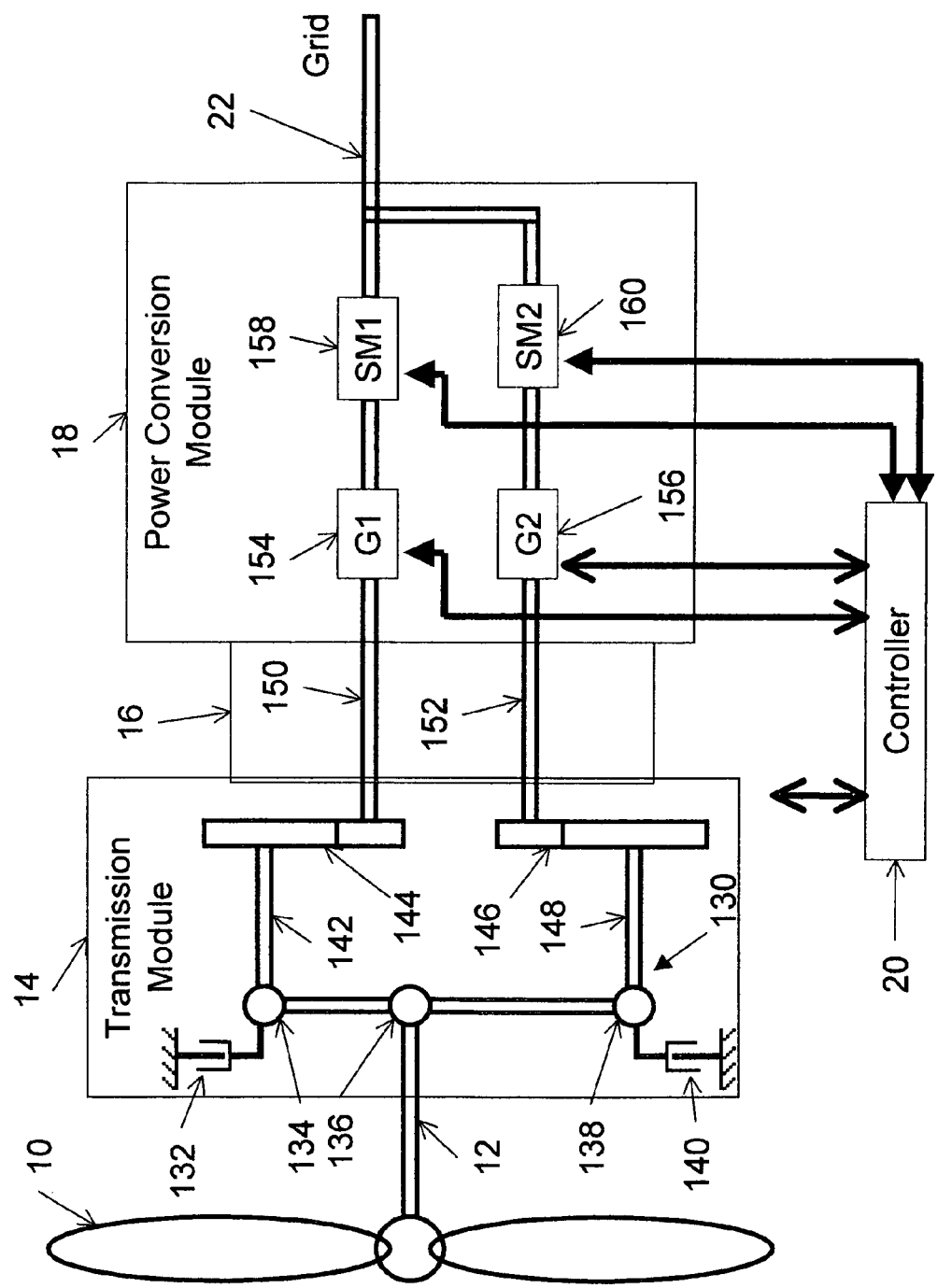
FIG. 6 illustrates example details of a system of FIG. 1 including a three note transmission.

Referring now to FIG. 6, the example shown includes transmission 130, having its input coupled to shaft 12. A first generator 154, in this example a variable speed generator, is coupled to the first transmission output shaft 150 through fixed ratio gear set 144 that is connected to output shaft 142. A second generator 156, a constant speed induction machine, is coupled to the second transmission output shaft 152 through fixed ratio gear set 146, connected to output shaft 148.

Generator 154 has control electronics 158 for commanding variable speed operation of the generator, and includes conditioning circuitry for converting the frequency output of the generator 154 to the reference frequency of the grid power 22 in a manner known in the art. Generator 156 is coupled to controller 160 for coupling reference power from the grid 22 to excite the stator of generator 156 and for coupling generated power back to the grid 22.

Transmission 130 includes a first node 134 coupled to the first transmission output shaft 150, a second node 136 that meshes with first node 134 and that is coupled to the shaft 12, and a third node 138 that meshes with second node 136 and is coupled to the second transmission output shaft 152. A controllable brake 132 is provided for the first node 134 and a controllable brake 140 is provided for the third node 138.

In operation, controller 20 controls brakes 132 and 140 so that they are unlocked. The outputs 150 and 152 are unlocked, generator 156 rotates at its synchronous speed, and generator 154 rotates at variable speed under control of controller 20 and its control electronics 158. Allowing the generator 154 to operate at a variable speed allows the speed of turbine 10 to continuously vary so that maximum wind energy is recovered at any wind speed. Through judicious sizing of the planetary gear set, the system can be designed such that less than 1/5th of the generated power passes through the variable speed generator 152, minimizing the cost of the generator and its associated electronics, while at the same time maximizing the efficiency of the system by allowing the turbine to operate at its most efficient speeds for a wide and continuous range of wind speeds. Thus in this example the multiple power flows are provided by through continuous variation of the operation of variable speed generator 152 in the motoring and generating states.

In a locked state, both brake clutches 132 and 140 are locked so that the turbine 10 is held stationary. In an alternate arrangement, brake clutch 132 is attached to shaft 140 and/or brake clutch 140 is attached to shaft 148. In another alternate arrangement, one or both brake clutches 132 and 140 are omitted and a brake clutch is attached to shaft 12.

Figure 7:
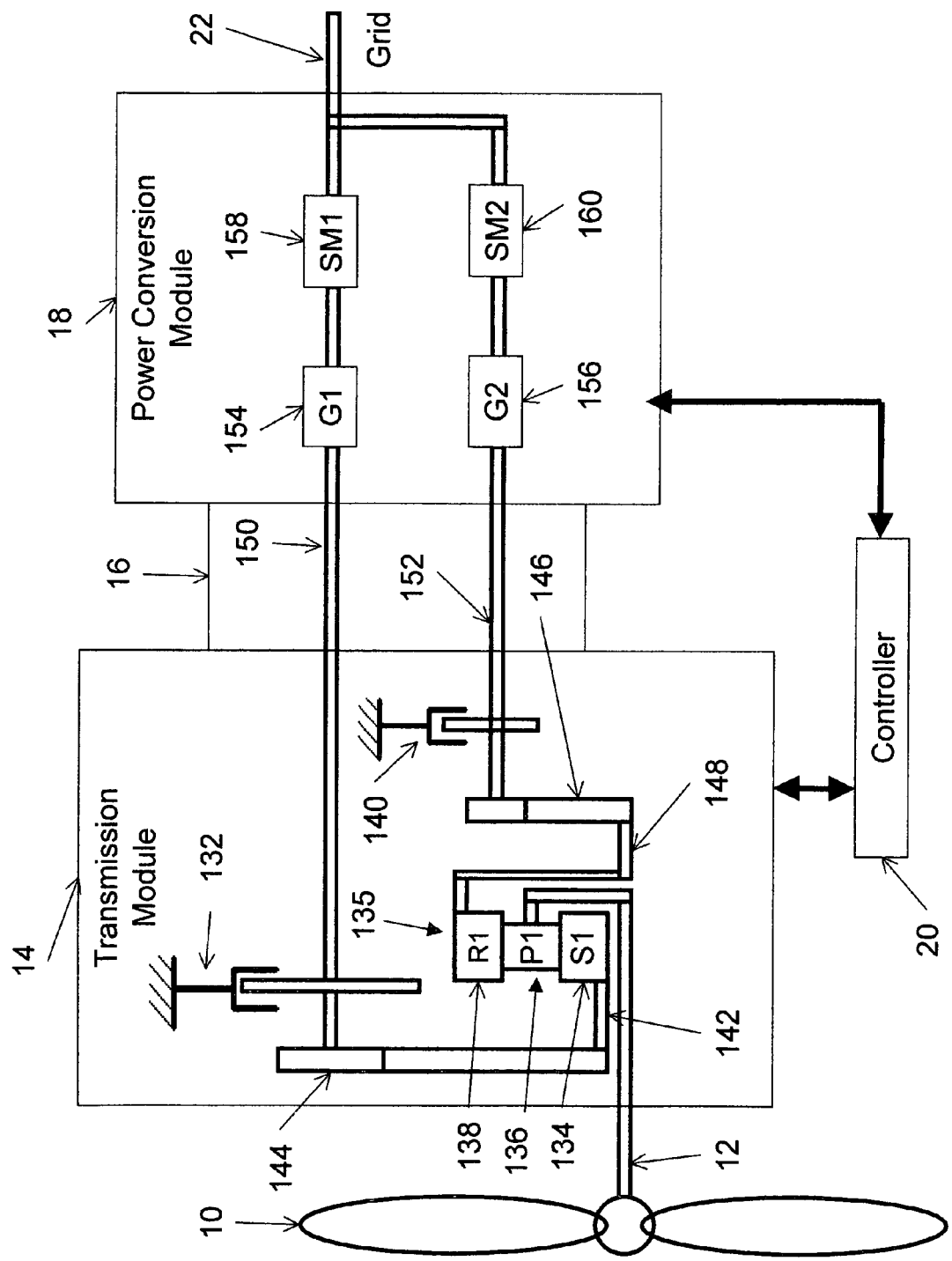
FIG. 7 illustrates example details of a system of FIG. 6.

Referring now to FIG. 7, in an example implementation, a system with a three node transmission is constructed according to the schematic illustrated. In an example implementation, the system is designed for a maximum wind speed of 26 mph, with a 10 m turbine 10 with an efficiency of 45%.

Figure 8:
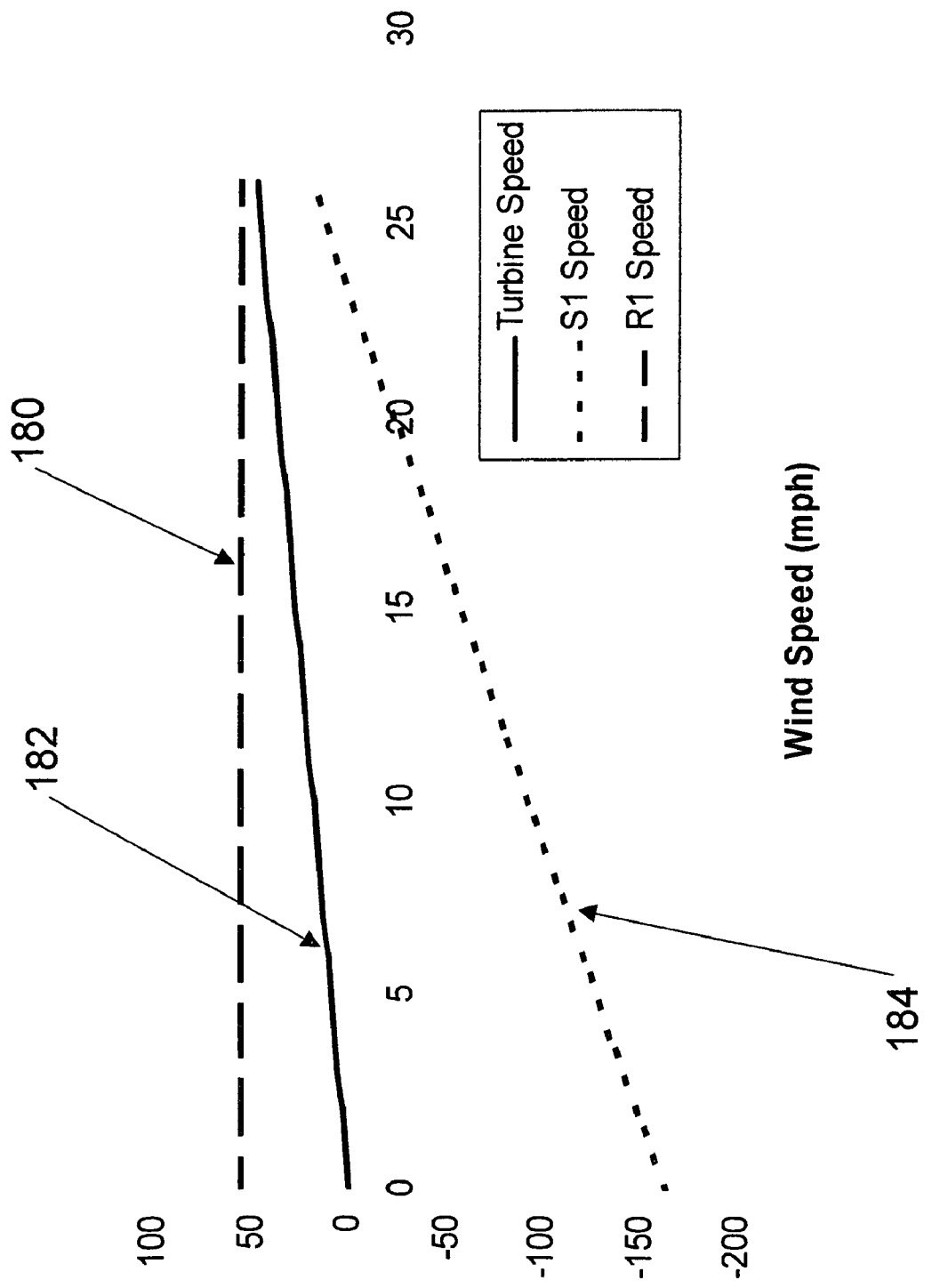
FIG. 8 illustrates an example graph of speeds of select components of an example system.

The planetary gear 135 set is sized with NR1=91 and NS1 =31. Fixed ratio gear set 146 is sized such that constant RPM generator 156 holds the ring gear at 55.6 RPM. Variable speed generator 154 works through fixed ratio gear set 144 to manage the speed of the sun gear S1 as per the graph shown in FIG. 8, in which reference 180 represents the rotational speed of generator 156, reference 182 represents the rotational speed of the turbine 10 and reference 184 represents the rotational speed of generator 154. As shown, generator 154 operates in both rotational directions (operating as a motor and a generator) to achieve the power split for generators 154 and 156.

Figure 9:
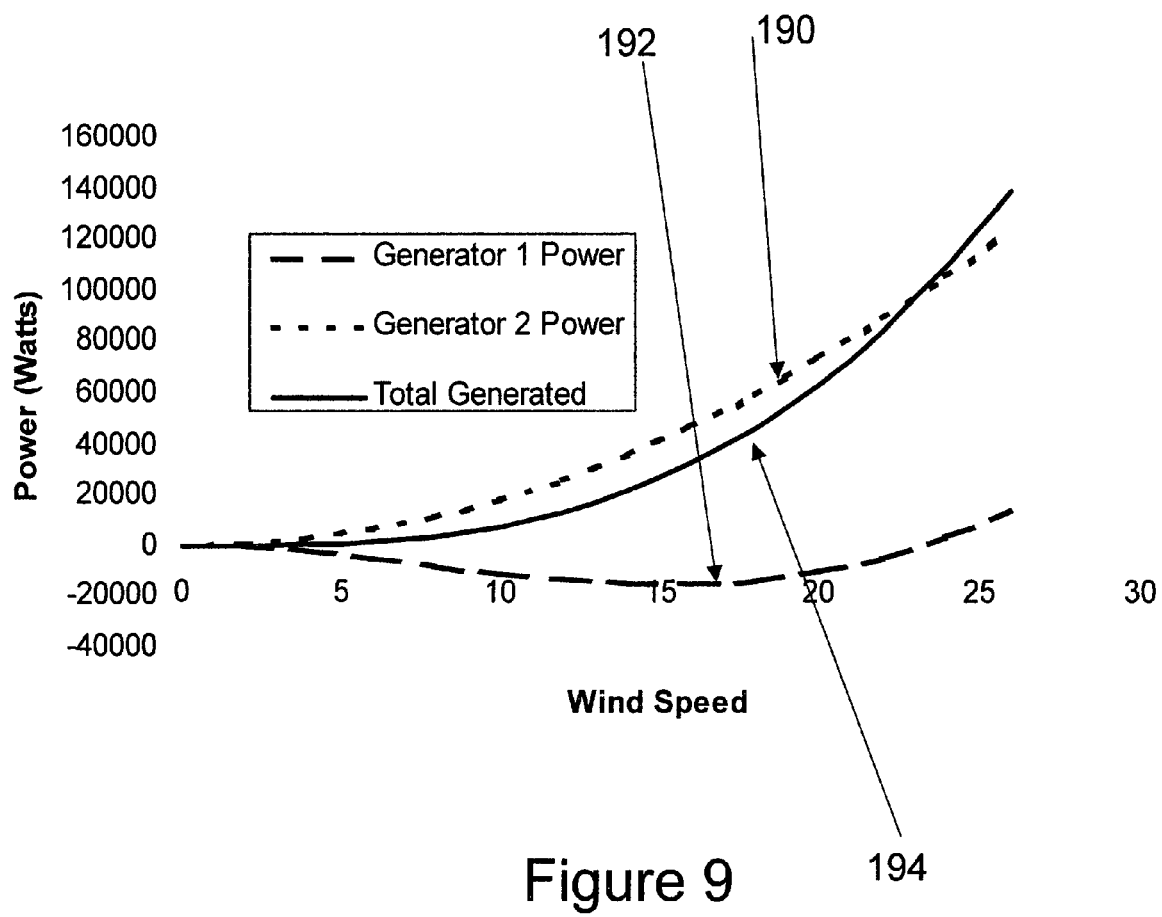
FIG. 9 illustrates example power output of an example system.
Figure 10:
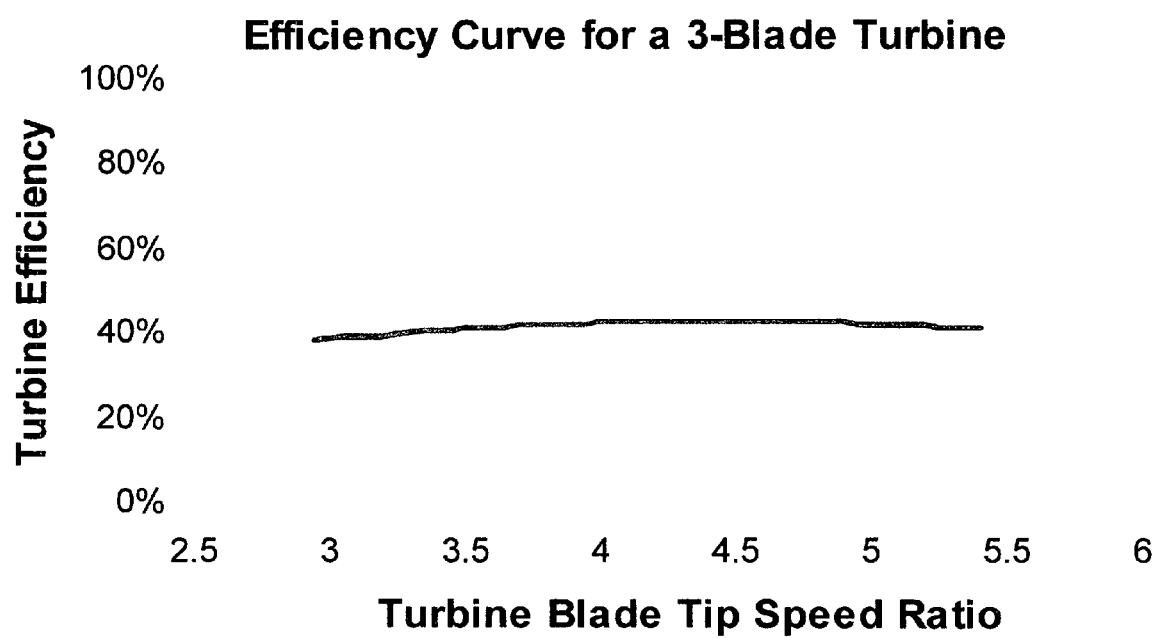
FIG. 10 is an example graph of an efficiency curve for a 3-blade wind turbine.

The power is split between the generators, with generator 154 alternately acting as a motor or a generator. Generator 156 is always acting as a generator, and recovers both the turbine energy and the motoring energy from generator 154 while it is motoring. The chart shown in FIG. 9 depicts the power into each generator as a function of wind speed, with reference 190 representing power provided by generator 156, reference 192 representing power used by and provided by generator 154 (which operates as a motor and generator) and reference 194 representing total power generated by the system.

Generator 154 is optimally sized when the generator 154 maximum motoring power equals the generator 154 maximum generating power. For this example, generator 154 is sized for 14.6 kW and generator 2 is sized for 124.1 kW for a total of 138.7 kW maximum at 26 mph wind speed.

Figure 11:
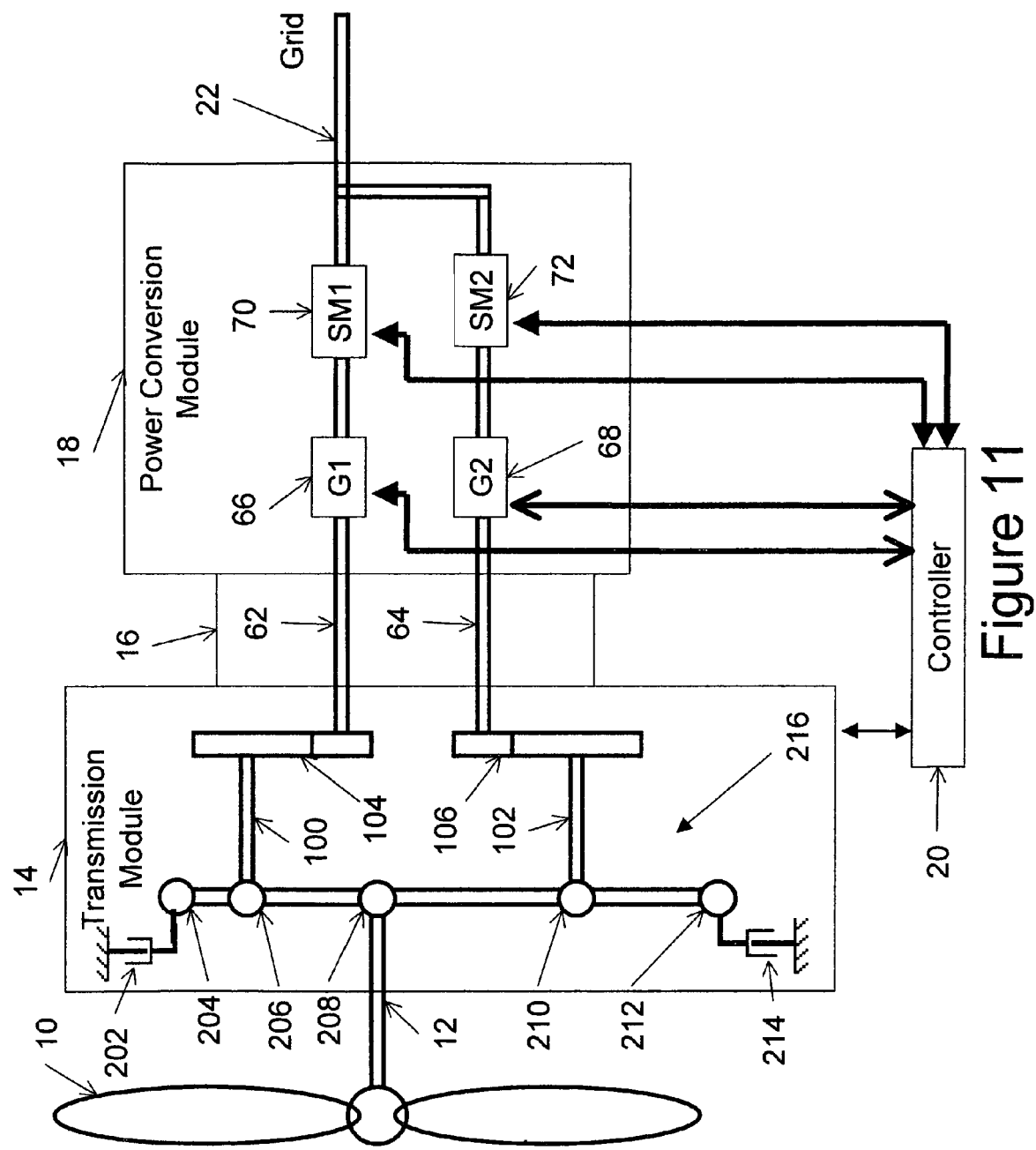
FIG. 11 illustrates example details of a system of FIG. 1 including a five node transmission.

Referring now to FIG. 11, the system shown includes transmission 216 having an input coupled to shaft 12 and at least first and second outputs transmission outputs 62 and 64 coupled to generators 66 and 68 through fixed gear sets 104 and 106. The controller 20 controls the transmission and the first and second generators 66 and 68 through the switching modules (controllers) 70 and 72.

The transmission 216 includes a first node 204 coupled to a first brake clutch 202. A second node 206 meshes with node 204 and is couple through fixed gear set 104 to the first output 62. A third node 208 meshes with node 206 and is coupled to shaft 12. A fourth node 210 meshes with third node 206 and is coupled through fixed gear set 106 to the second output 64. And a fifth node 212 meshes with the third node 210 and is coupled to a second brake clutch 214.

Similar to the previous example, in a first range of wind speed impinging on the turbine, brake clutch 214 is locked, brake clutch 202 is unlocked, the first output 62 provides power to the first generator 66 and the second output 64 free-spins as generator 68 is turned off and also spins freely. In a second range of wind speed impinging on the turbine, brake clutch 214 is unlocked, brake clutch 202 is locked, the second output 64 provides power to the second generator 68 and the first output 62 free-spins as generator 66 is turned off and also spins freely. In a third range of wind speed impinging on the turbine, brake clutch 202 is unlocked, brake clutch 214 is unlocked, the second output 64 provides power to the second generator 68 and the first output 62 provides power to first generator 66. Generator 68 has a maximum power rating greater than that of generator 66. In a locked state, brake clutch 202 and brake clutch 214 are both applied to prevent the turbine from spinning. In one example, the maximum power rating of the second generator is double the maximum power rating of the first generator.

In the above design, the five node transmission may be implemented using planetary gear sets—for example any planetary gear combination consisting of five unique connection points.

Figure 12:
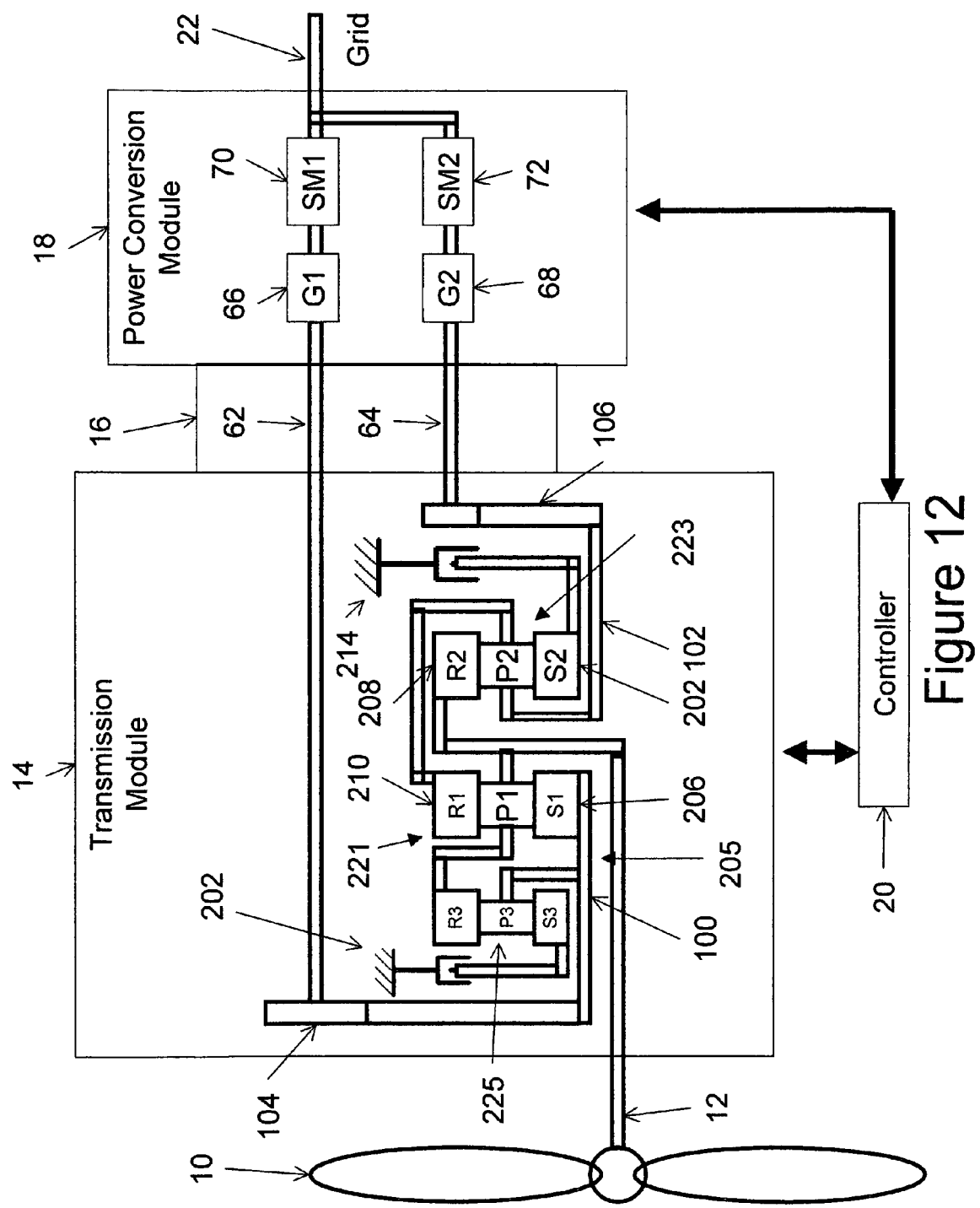
FIG. 12 illustrates example details of a system of FIG. 11.

Referring now to FIG. 12, the five node transmission is three simple planetary gear sets with carrier P1 of the first set 221 connected to the ring gear R2 of the second set 223 and to the ring gear R3 of third set 225. The carrier P1, ring gear R2, and ring gear R3 comprise the node 88. The carrier P2 of the second planetary gear set 223 is connected to the ring gear R1 of the first planetary gear set 221. The carrier P2 and ring gear R1 comprise the node 210. The carrier P3 of third set 225 is connected to the sun gear S1 of set 221. The carrier P3 and sun gear S1 comprise node 206. Many alternate gear set arrangements also work, and the selection is mostly a matter of ratio selection and packaging.

The brake clutches 214 and 202 can be any locking mechanism which selectively prevents the rotation of the components to which it is connected, as well as an actuator for said locking mechanism. The locking mechanism could be a disk brake, a shift sleeve and fork, a friction clutch, a magnetic brake, a locking one-way clutch, or any other type of holding mechanism. The actuator could be a solenoid, servo motor, hydraulic pump and valves, power supply and controller, or any actuator that is appropriate for controlling said locking mechanism for the given application. Since either brake clutch 214 or brake clutch 202 may be applied and released often while the system is active, it is recommended that both be of a design with low parasitic losses and no friction components. Also, since the elements connected to brake clutches 214 and 202 never counter-rotate, a one-way brake clutch may be used in parallel with said locking clutches to assist in brake clutch synchronization.

The fixed ratio gear sets 104 and 106 can be any constant-ratio gear set, either planetary or parallel-axis.

In this example the first and second generators 66 and 68 are preferably constant RPM induction generators of sufficient power to match the desired operating points, as will be described below.

Controller 70 for the first generator 66 may be implemented in a known manner to both stop and start generator 66 by cutting off and applying field excitation current. The ability to limit current for a 'soft-start' with controlled acceleration is also desirable. The controller should also provide a braking function. This can be accomplished by injecting a DC current into the stator windings, or by swapping two of the phases, thereby reversing generator direction and causing it to motor in the opposite direction. While DC-braking and phase-swapping are simple methods for producing braking, any method of adjusting down the supply current frequency will produce a braking effect and therefore can be substituted. This function is utilized to assist in the changing the gear ratio of the system.

Generator controller 72 may be identical to controller 70.

The controller 20 is any controller with the ability to control the generator controllers 70 and 72 and the brake clutches 202 and 214. The controller 20 is also able to sense the amount of power being generated. This can be done directly by measuring voltage and/or current from both generators, or indirectly by sensing the speed of generators 66 and 68. Other means of calculating generated power can also be substituted. Other functions added to the controller (such as the ability to communicate with and/or receive commands from a central station, sense wind speed and direction, etc. etc.) may be implemented as desired but are not central to this invention. The location of the above described control functions is also not pertinent. They could reside in three separate controllers, one controller embodying all functions, or within a centralized station.

In a shutdown or maintenance mode, the windmill is in the 'Locked' state in which both generators 66 and 68 are deactivated. Brake clutch 214 is applied, holding node 212 stationary. Brake clutch 202 is also applied, holding node 204 stationary. With nodes 212 and 204 held stationary, the planetary gear set is locked and both the turbine 10 and generators 66 and 68 are unable to spin.

At very low wind speeds, the windmill can be put in an 'Idle' state; generators 66 and 68 are both deactivated. Brake clutch 214 is applied, but brake clutch 202 is released. The turbine 10 is allowed to spin and will spin as determined by wind speed. But, the system will not generate any power since both generators 66 and 68 are off even though they both may be spinning. Generator 66 will be over-driven relative to turbine speed and generator 68 will be under-driven, as dictated by the gear ratio.

At wind speeds sufficient to generate power, the windmill is put in a 'First Gear' state. Brake clutch 214 is applied and brake clutch 202 is released (as in 'Idle'), and controllers 20 and 70 control generator 66 so that it is activated. Generator 68 is de-activated and thus spins freely. Generator 66 can thus be sized for a certain wind speed range and it will manage the turbine speed through the combined ratio of the planetary gear set 221, 223, 225 and the fixed ratio gear set 104.

At higher wind speeds, the windmill is put in a 'Second Gear' state. Brake clutch 202 is applied and brake clutch 214 is released, and controllers 20 and 72 control generator 68 so that it is activated. Generator 66 is de-activated and thus spins freely. Generator 68 can thus be sized for a certain wind speed range and it will manage the turbine speed through the combined ratio of the planetary gear set 221, 223, 225 and the fixed ration gear set 106.

At higher again wind speeds, the windmill is put in a 'Third Gear' state. Both brake clutches 202 and 214 are released. This causes the turbine to accelerate to a speed dependent upon the fixed ratio gear sets 104 and 106, generator 66, 68 operating speeds and the ratios of planetary gear sets 221, 223, 225. The simplest example has both generators 66, 68 at the same base speed and the ratios of gear sets 104, 106 identical, in which case turbine speed will equal generator speed adjusted by the fixed ratio of the gear sets 104, 106.

At extremely high wind speeds, the turbine 10 may be turned at an angle to the wind via a yaw motor and drive of a known type to reduce wind power into the system to a manageable level, or the system can be shut down completely by locking both brakes 202, 214. The use of a yaw drive in such a manner is well known and common to many systems.

To minimize parasitic losses, brake clutch 214 may be a mechanical locking mechanism such as a shift fork & sleeve design. A shift sleeve cannot be disengaged when it is loaded, and cannot be applied in high inertia systems when there is a large speed differential across it. During a transition from the 'First Gear' state to the 'Second Gear' state, generator 66 should be shut off when brake clutch 214 is transitioning. There will be little load across brake clutch 214 when both generators 66, 68 are deactivated. During a transition from 'Second Gear' state to 'First Gear' state, controllers 20 and 72 control generator 68 so that it provides braking torque, until the speed of node 210 is sufficiently low such that brake clutch 214 can be applied without imparting inertial shock into the system. Similarly, during a transition from 'Third Gear' state to 'Second Gear' state, controllers 20 and 70 control generator 66 so that is provides a braking torque until the speed of node 204 is sufficiently low such that brake clutch 202 can be applied without imparting an inertial shock into the system.

In an example implementation, the upper and lower operating points of the system are wind speeds of 16 mph and 24 mph. Since wind power increases with the cube of wind speed, generator 72 should be approximately $(24/16)^3-1$ times the size of generator 66, or 2.375 times larger. The midpoint operating range X has to fall within generator 72 capacity, which is satisfied if $(X/16)^3<=2.375$, or $X<=21.3$ mph. In this example, the midpoint is set to 21.3 mph, both generators have the same synchronous speed and the fixed ratios of gear sets 104 and 106 are identical. For "Third Gear" state operation, the power into generator 68 is 2.375× the power into Generator 1. This is solely dictated by planetary gear set 221 and can be achieved if NR1/NS1=2.375. Selecting NS1=37 and NR1=91 yields 2.45, which is substantially close the desired 2.375 and acceptable for operational purposes. With planetary gear set 221 defined, values can be selected for planetary gear set 223 such that the "First Gear" ratio of turbine 10 speed to the speed of sun gear S1 is 16/24 (or ⅔). Since ring gears R1, R2 tend to be the most expensive part of a planetary gear set, keeping them common may prove to be cost effective, so in this example NR2 is also set so that NR2=91=NR1. Then, solving the planetary speed equation of (NR2+NS2)/(NR2+NS2+NR1*NS2/NS1)=⅔ gives NS2=23 as close to ideal. Also with planetary gear set 221 defined, values can be selected for planetary gear set 225 such that the "Second Gear" ratio of turbine 10 to the speed of ring gear R1 is 21.3/24. Again, to be cost effective, NR1 is also set so that NR1=NR2=NR3=91. Then, solving the planetary gear set equation of (NR3+NS3)/(NR3+NS3+NS1*NS3/NR1)=21.3/24 gives NS3=37 as substantially close.

Specific sizing of the generators is dependent upon turbine size and efficiency. For example, a 10 m radius turbine 10 sweeps 314 m² area, and captures 71.8 kW at 16 mph and 242 kW at 24 mph wind speeds. Assuming a 45% turbine 10 efficiency, generator 66 should be sized to operate efficiently at 71.8×0.45=32 kW, and generator 68 should be sized to operate efficiently at 242×0.45−32=76.8 kW. Assuming a tip speed ratio (the ratio of the speed at the tip of the wind turbine blade to the wind speed) of 4.175 fixed ratios of gear sets 104 and 106 are sized to hold shafts 100 and 102 to 43 RPM when generator 66 and generator 68 are at their synchronous speeds. The following table summarizes the design parameters for this example:

|  |  |  | 1st | 2nd | 3rd |
|---|---|---|---|---|---|
| Gear Set |  |  |  |  |  |
| R1 | 91 | Wind Speed (mph) | 16 | 21.3 | 24 |
| S1 | 37 | Tip Speed (mph) | 67 | 89 | 100 |
| R2 | 91 | Tip Speed (m/s) | 30 | 40 | 45 |
| S2 | 23 | Turbine RPM | 29 | 38 | 43 |
| R3 | 91 | Wind Power (W) | 71,850 | 170,645 | 242,495 |
| S3 | 37 | Turbine Power (W) | 32,333 | 76,790 | 109,123 |
| Turbine |  | Generator 1 Speed | 43 | 27 | 43 |
| radius | 10 m | Generator 2 Speed | 23 | 43 | 43 |
| Area | 314 | Generator 1 Power | 32,333 | 0 | 32,333 |
| cp | 0.45 | Generator 2 Power | 0 | 76,790 | 76,790 |
| TSR | 4.175 |  |  |  |  |
|  |  | Total Power | 32,333 | 76,790 | 109,123 |

Alternate five-node planetary gear sets can easily be used in view of the teachings herein by properly selecting the gear ratios. In the above example, the generators 66, 68 both have the same number of poles and therefore both the same synchronous speeds. In alternative examples, the generators 66, 68 may have first and second numbers of poles that are not equal to each other.

The above described methods and systems are examples of this invention and are not meant to be limiting. Many variations will become apparent to those skilled in the art, including varying the gear ratios to match the system to different wind speed ranges, sizing the system for various power generation levels, implementing multiple systems together in "farms," and extending the transmission module to include more than two output shafts with associated generators.

The invention claimed is:

1. A system for converting wind power to electrical power comprising a transmission module with multiple power flows to an output and a first generator coupled to the output, wherein the first generator operates at substantially constant speed for the multiple power flows, wherein the first generator receives excitation current at a frequency controlled by a power grid and wherein the electrical power is provided to the power grid, wherein the first generator is mechanically coupled to the transmission module and electrically coupled to the power grid selectively through a switching module; also comprising a controller for controlling the transmission module and the switching module, wherein the frequency of the excitation current defines a synchronous speed of the first generator, wherein the controller controls gear ratio of the transmission module so that the wind energy provides power driving the first generator at a speed equal to or with positive slip to the synchronous speed for at least two ranges of wind speed.

2. A system for converting wind power to electrical power comprising a transmission module with multiple power flows to an output and a first generator coupled to the output, wherein the first generator operates at substantially constant speed for the multiple power flows, wherein the transmission module proportions power between the first generator and a second generator, wherein the second generator is a variable speed generator, also including a power electronics control for the second generator, wherein electrical power coupled through the power electronics control is less than one half of the power generated by the system.

3. A system according to claim 2, wherein electrical power coupled through the power electronics control is less than one eighth of the power generated by the system.

4. A system for converting wind power to electrical power comprising a transmission module with multiple power flows to an output and a first generator coupled to the output, wherein the first generator operates at substantially constant speed for the multiple power flows, wherein the transmission module proportions power between the first generator and a second generator, wherein the system is selectable between at least: a first state in which a first of the multiple power flows transfers power to the first generator and the second generator is not operable to generate power to the grid, a second state in which a second of the multiple power flows transfers power to the second generator and the first generator is not operable to generate power to the grid, and a third state in which a third of the multiple power flows transfers power to the first generator and the second generator.

5. A system according to claim 4 including a controller coupled to the transmission module and responsive to an input representative of wind speed, wherein the controller selects the first state in response to a first wind speed range, wherein the controller selects the second state in response to a second wind speed range greater than the first wind speed range, and wherein the controller selects the third state in response to a third wind speed range greater than the second wind speed range.

6. A system for converting wind power to electrical power comprising a transmission module with multiple power flows to an output and a first generator coupled to the output, wherein the first generator operates at substantially constant speed for the multiple power flows, wherein the system includes a first power distribution state having a first fixed speed ratio and including a first control brake, the first generator, and a second generator, and a second power distribution state having a second speed ratio, the first generator, and the second generator, and wherein the transmission module includes a double planetary gear set, concentric with an input shaft and including in order of rotational speed a first node, a second node, a third node, and a fourth node, said first control brake being operable to fix said fourth node against rotation, said third node being fixed for rotation with said second generator, said second node being fixed for rotation with said input shaft, said first node being fixed for rotation with said first generator, said system providing two power distributions to said generators by selective operation of said first control brake, wherein a lock state of the first control brake defines the first power distribution, and wherein a release state of the first control brake defines a second power distribution.

7. A system according to claim 6, wherein said first control brake includes a one-way brake operable to fix said fourth node against rotation only in a first direction.

8. A system for converting wind power to electrical power comprising a transmission module with multiple power flows to an output and a first generator coupled to the output, wherein the first generator operates at substantially constant speed for the multiple power flows, wherein the system includes a first power distribution state having a first fixed speed ratio and including a first control brake, the first generator, and a second generator, a second power distribution state having a second speed ratio, and including a second control brake, the first generator, and the second generator, and a third power distribution state having a third speed ratio and including the first and second generators, wherein the transmission module includes planetary gear sets, concentric with an input shaft and including in order of rotational speed a first node, a second node, a third node, a fourth node, and a fifth node, said first control brake being operable to fix said fifth node against rotation, said fourth node being fixed for rotation with said second generator, said third node being fixed for rotation with said input shaft, said second node being fixed for rotation with said first generator, said second control brake being operable to fix said first node against rotation, said system providing the three power distributions to said generators by selective operation of said first and second control brakes, wherein first control brake is locked and the second control brake is released to define the first power distribution, wherein the first control brake is released and the second control brake is locked to define the second power distribution, and wherein the first and second control brakes are released to define the third power distribution.

9. A system for converting wind power to electrical power comprising a transmission module with multiple power flows to an output and a first generator coupled to the output, wherein the first generator operates at substantially constant speed for the multiple power flows, wherein the system includes a first power distribution state operative over a first range of continuously variable speed ratios and including the first generator and a second generator operating as a motor, and a second power distribution state operative over a second range of continuously variable speed ratios and including the first and second generators, and wherein the transmission module includes a planetary gear set including a first node, a second node, and a third node, the first node being fixed for rotation with the second generator, said second node being fixed for rotation with said input shaft, said third node being fixed for rotation with said first generator, said system providing the two power distributions to said generators by selective operation of the second generator between motoring and generating states.

10. A system for converting wind energy into electrical energy including a first power generator of substantially constant frequency, a second power generator of variable frequency and speed, and a transmission module proportioning power between a turbine, the first power generator and the second power generator, wherein the turbine operates at a continuously variable speed, the first power generator operates at substantially constant speed and the second power generator operates at variable speed.

11. The system according to claim 10 wherein the second power generator has a first operational state as a motor and a second operational state as a generator.

* * * * *